United States Patent
Brown (10) Patent No.: US 9,727,311 B2
(45) Date of Patent: Aug. 8, 2017

(54) GENERATING A SERVICE DEFINITION INCLUDING A COMMON SERVICE ACTION

(75) Inventor: Gary Peter Brown, Hitchin (GB)

(73) Assignee: Red Hat, Inc., Raleigh, NC (US)

( * ) Notice: Subject to any disclaimer, the term of this patent is extended or adjusted under 35 U.S.C. 154(b) by 321 days.

(21) Appl. No.: 13/415,163

(22) Filed: Mar. 8, 2012

(65) Prior Publication Data

US 2013/0239095 A1 Sep. 12, 2013

(51) Int. Cl.
| | | |
|---|---|---|
| G06F 11/36 | (2006.01) | |
| G06F 9/44 | (2006.01) | |
| H04L 29/06 | (2006.01) | |
| H04L 12/26 | (2006.01) | |

(52) U.S. Cl.
CPC .................. G06F 8/10 (2013.01); G06F 8/35 (2013.01); *H04L 43/18* (2013.01); *H04L 65/1006* (2013.01); *H04L 65/1059* (2013.01)

(58) Field of Classification Search
CPC ... G06F 8/35; G06F 8/10; H04L 43/18; H04L 65/1006; H04L 65/1059
USPC .......................................................... 717/128
See application file for complete search history.

(56) References Cited

U.S. PATENT DOCUMENTS

| | | | | |
|---|---|---|---|---|
| 2007/0074080 A1* | 3/2007 | FitzGerald | .............. | H04L 43/18 714/45 |
| 2009/0049429 A1* | 2/2009 | Greifeneder | ........ | G06F 11/3495 717/128 |
| 2010/0088384 A1 | 4/2010 | Wilkinson et al. | | |
| 2010/0293018 A1* | 11/2010 | Heuer | .................... | G06Q 10/06 705/7.27 |
| 2011/0004862 A1* | 1/2011 | Kejriwal | .................. | G06F 8/10 717/104 |
| 2011/0179046 A1* | 7/2011 | Paull | ........................ | G06F 8/10 707/754 |

OTHER PUBLICATIONS

Alalfi, Manar et al. "Automated Reverse Engineering of UML Sequence Diagrams for Dynamic Web Applications. " International Conference on Software Testing, Denver, Colorado—USA Apr. 4, 2009. 30 Pages. http://selab.fbk.eu/WebTest2009/WebTestPres-Jim.pdf.*
Tribastone, Mirco et al. "Automatic translation of UML sequence diagrams into PEPA models.". In 5th International Conference on the Quantitative Evaluation of Systems (QEST 2008), pp. 205-214, St Malo, France, 2008. IEEE Computer Society Press. (PDF, 311224 bytes). http://www.dcs.ed.ac.uk/pepa/uml2pepa.pdf.
Moss "Savara—Project Charter", Version 1.0, Aug. 18, 2009, 21 Pages.

* cited by examiner

*Primary Examiner* — Wei Zhen
*Assistant Examiner* — Mohammed Huda
(74) *Attorney, Agent, or Firm* — Lowenstein Sandler LLP (57) ABSTRACT

A method and system for generating a set of service definitions relating to a computer application based on a set of interaction models relating to a set of participants in the interaction models. For each participant, a set of message traces is extracted from the set of interaction models and common message events in each message trace are identified. The common message events are transformed into service actions and a service definition is generated including the service actions. The generated service definition may then be deployed on a suitable computing system, such as, for example, a Service Oriented Architecture (SOA) platform.

21 Claims, 4 Drawing Sheets

GENERATING A SERVICE DEFINITION INCLUDING A COMMON SERVICE ACTION

TECHNICAL FIELD

Embodiments of the present invention relate to enterprise computing systems, and more specifically, to developing enterprise applications in accordance with user requirements.

BACKGROUND

Conventional enterprise computing systems include enterprise applications designed to for large scale deployment via a Service Oriented Architecture (SOA) platform. As the complexity and scope of these enterprise applications continues to grow, it has become increasingly important to improve the productivity and efficiency in the manner in which enterprise applications are built. Furthermore, in conventional systems, the service definitions associated with a service are manually created For example, the development of complex large scale distributed systems can be particularly challenging if the individual applications/services of the system are implemented by different developers, which may be geographically dispersed. In such cases, conventional development tools and techniques fail to ensure that the overall large scale system will function properly when all of the applications/services are deployed together. In this regard, current development approaches fail frequently produce systems which lack interoperability among the multiple independently developed applications/services.

DETAILED DESCRIPTION

Methods and systems for transforming a set of interaction models into a set of service definitions for deployment in a computing system such as a Service Oriented Architecture (SOA) platform. The methods and systems provide a development tool for use by a developer in building one or more applications, particularly large scale applications, for deployment onto a SOA platform. The development tool includes a service definition generator configured to receive a set of interaction models (e.g. Unified Modeling Language (UML) Sequence Models) from a user (e.g., an application developer). The interaction models represent an expression of the user's/developer's requirements in the form of a sequence of interactions between a set of co-operating participants.

As used herein, the term "participant" includes any entity capable of performing a function relating to the interaction model, such as, for example, a service, an application, an individual, a business unit, an organization, or the like. As used herein, the term "service definition" refers to any abstract or concrete executable representation describing the behavior of a service, including the manner in which the service interacts with other participants in an overall system. Exemplary service definitions include Web Services Business Process Execution Language (WS-BPEL) representations, Business Process Model and Notation (BPMN) representations, or any suitable structured programming language (e.g., Java, Visual C#, etc.).

In an embodiment, an interaction represents the exchange of information (e.g., in the form of a typed message) between two participants. For example, a buyer participant may send an 'Order' XML message to a store participant. The service can be configured such that the store receives the Order message from the buyer, and subsequently sends a 'CreditCheck' message to a 'CreditAgency' participant, awaiting a response before deciding whether to send an 'Accept' or 'Reject' message back to the buyer. In this example, the service's behavior represents the communication constructs (e.g., send or receive) and other higher level constructs (e.g., branching based on decisions) that determine how the service acts depending upon an internal state and the message content received as part of the service's interactions with other participants. In this example, the store interacts with the buyer and the CreditAgency participant to enact its behavior.

In an embodiment, the methods and systems allow the user/developer to describe the service's requirements as a series of "use cases" defined by the interaction models (e.g., the sequence diagrams). Each interaction model of the set of interaction models provided by the user/developer represents a possible path through a process (e.g., a business process) configured to achieve a particular objective (e.g., a business goal), expressed as a set of interactions between co-operating participants. An exemplary objective associated with a particular interaction model may be "handle a successful purchase order". The objective may contain interactions including the buyer participant submitting an order to the store participant, the store participant sending a request to the CreditAgency participant, the and store participant receiving an "approved" response from the CreditAgency participant, and the store participant sending a confirmation message back to the buyer participant. Another exemplary interaction model may represent the objective of "handling an insufficient credit situation", wherein the CreditAgency participant returns a "credit rating" to the store participant, and the store participant returns an 'Order Reject' message to the buyer participant, based on the poor credit rating.

Advantageously, the methods and systems according to embodiments of the present invention transform the interaction models into a set of service definitions, wherein each service definition expresses the expected behavior/actions of one participant in the set of interaction models.

Furthermore, the methods and systems according to embodiments of the present invention may be used to develop large scale distributed computing systems including multiple co-operating participants (e.g., services) and multiple developers. By deriving the service definition from the set of interaction models provided by the one or more developers, the methods and systems according to embodiments of the present invention ensure that the generated service definition enables each participant to perform its expected functions and properly interact with the other participants upon deployment of the overall system. Creation of the service definition based on a defined set of user requirements represented by a set of interaction models reduces co-operation issues when integrating multiple independently developed services.

Figure 1:
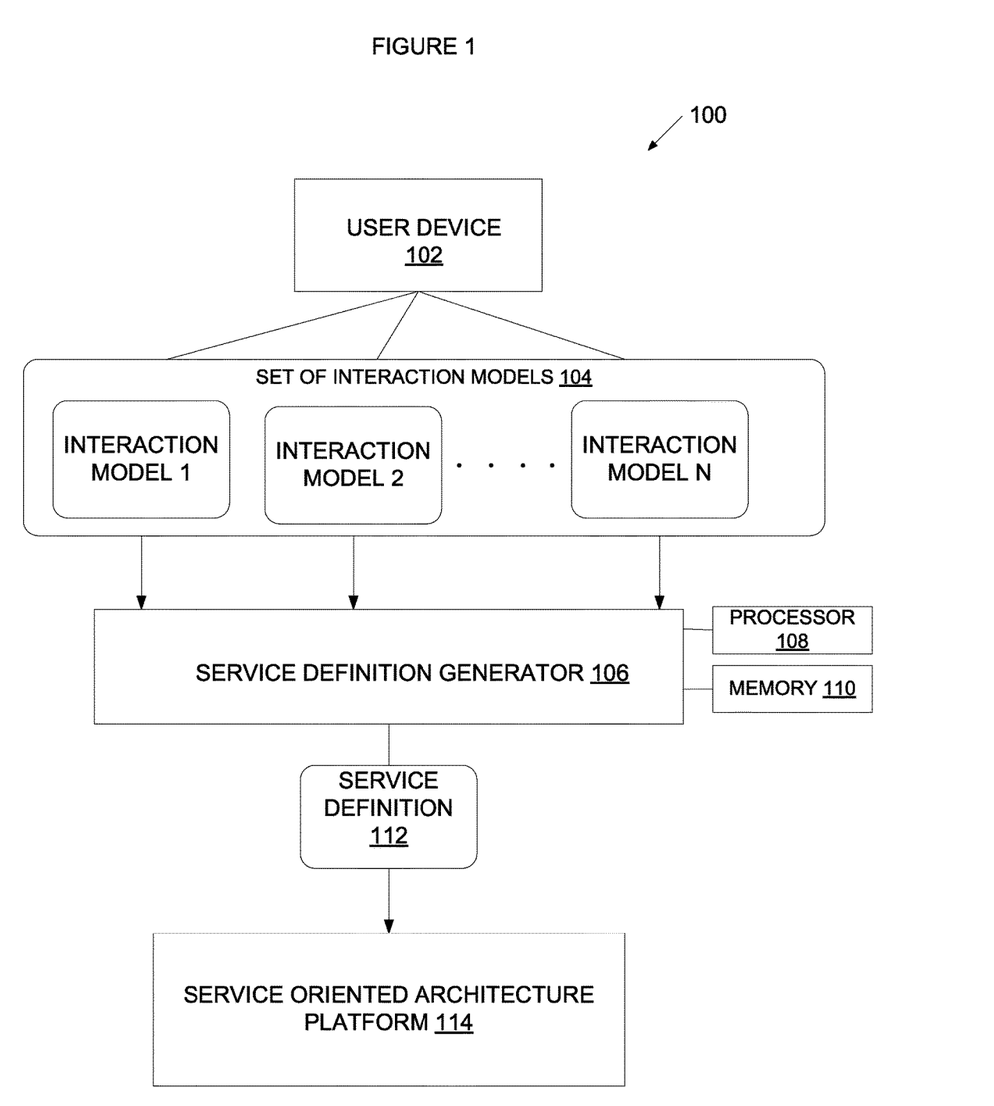
FIG. 1 is a block diagram of an exemplary computing environment including a service definition generator, according to embodiments of the invention.

FIG. 1 is a block diagram of an exemplary computing environment 100 according to embodiments of the invention. The computing environment 100 includes one or more user devices 102 configured to provide a set of interaction models 104 (e.g., the set including interaction model 1, interaction model 2, . . . interaction model N) to a service definition generator 106 configured to generate one or more service definitions 112 based on the set of interaction models 104. The user device 102 may include any type of computing device such as, for example, a desktop computer, a portable digital assistant, a mobile phone, a laptop computer, a portable media player, a tablet computer, a netbook, a notebook, or a personal computer. In an embodiment, the user device 102 includes a user interface configured to allow a user (e.g., an application developer) to input the set of interaction models and access the service definition generator 106.

In an embodiment, the service definition generator 106 is a software component (e.g., a set of instructions residing in memory 110) executable by a processing device (e.g., processor 108) which provides the user with a tool for the development of one or more service definitions and performance of the functionality described in detail below.

In an embodiment, the service definition generator 106 may be hosted by a computing device (e.g., a server) and accessed by the user device 102 via a network (not shown), such as, for example, a public network such as the Internet, a private network such as a local area network (LAN), or a virtual private network (VPN)).

In an embodiment, the service definition generator 106 may reside on a remote computing device (e.g., a server) and be downloaded to and reside locally on the user device 102. In this example, the processor 108 and memory 110 may be the local processing device and memory of the user device 102. In another embodiment, the service definition generator 106 may be installed on the user device 102 from any suitable non-transitory computer-readable storage medium. It is noted that any suitable arrangement may be employed such that the user device 102 may utilize the service definition generator 106 to perform the functions described in detail below in connection with FIGS. 2 and 3.

As shown in FIG. 1, the service definition generator 106 is configured to receive the set of interaction models 104 and generate the service definition 112 for deployment on a computing system, such as, for example, a Service Oriented Architecture (SOA) platform 114. Although the exemplary embodiment shown in FIG. 1 illustrates the set of interaction models 104 including multiple interaction models, it is noted that the set of interaction models 104 may include a single interaction model. In an embodiment, the user/developer may produce the set of interaction models 104 using any suitable interaction model generator (e.g., a UML Sequence Model editor). The interaction model generator may be a program residing on the user device 102, may be provided to the user device 102 by the service definition generator 106, or may be an integral part of the service definition generator 106.

Figure 2:
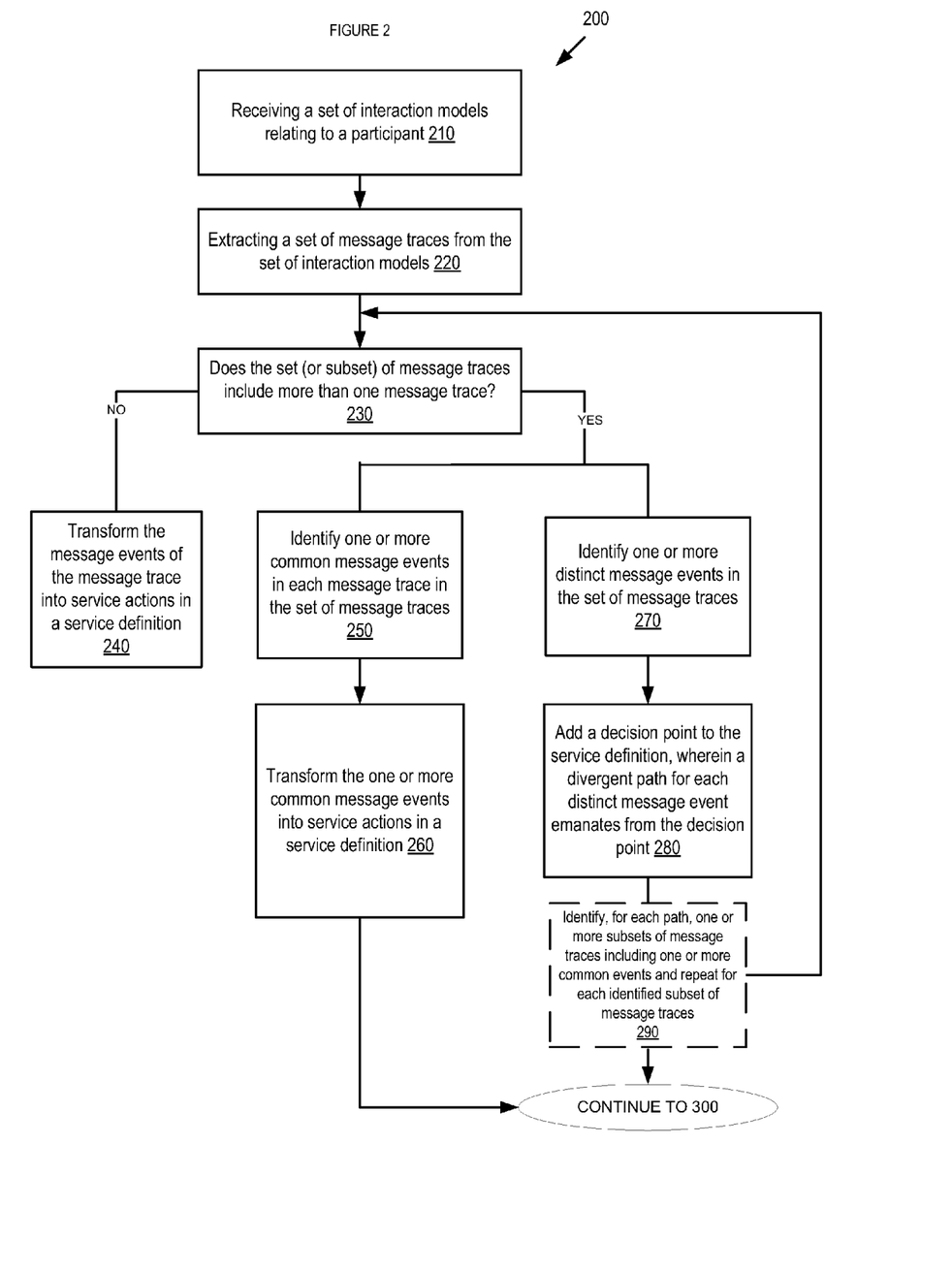
FIG. 2 is a flow diagram of exemplary methods for generating a service definition, according to an embodiment of the present invention.

FIG. 2 is a flow diagram of one embodiment of a method 200 for generating a service definition based on a set of interaction models. The method is performed by processing logic that may comprise hardware (circuitry, dedicated logic, etc.), software (such as is run on a general purpose computer system or a dedicated machine), or a combination of both. In one embodiment, the method is performed by a processing device configured to execute a service definition generator (e.g., the service definition generator 106 of FIG. 1).

In an embodiment, the set of interaction models includes a representation of a sequence of interactions (also referred to as "message exchanges") between a set of co-operating participants. In an embodiment, each interaction model describes a distinct path through a process (e.g., a business process) involving all or a portion of the participants. Based on the set of interaction models, a list of distinct participants involved in set of interaction models is identified. It is noted that the list of participants may be identified by the user/developer or by the service definition generator.

In an embodiment, for each identified participant, a set of interaction models involving the particular participant is identified. Referring to FIG. 2, in block 210, the service definition generator receives the set of interaction models relating to the participant from the user/developer (e.g., from the user computer 102 in FIG. 1) or as generated based on information received from the user/developer. In block 220, the set of interaction models are examined and a set of message traces (i.e., one message trace per interaction model) for the participant is extracted from the set of interaction models. A message trace represents the inbound (received) message event and the outbound (sent) message event for the participant within the particular interaction model.

Continuing the example described above, the store participant can have an inbound (received) message event representing the 'Order' message from the buyer participant, followed by an outbound (sent) message event to the CreditAgency participant. In the example, the message trace associated with the store participant then continues with an inbound (received) message event representing the 'CreditRating' response from the CreditAgency participant and an outbound (sent) message event to the buyer participant including a 'confirmation' message.

In block 230, it is determined whether the set of message traces includes a single message trace or multiple message traces. If, in block 230, it is determined that the set of message traces includes a single message trace, then the message events (i.e., the inbound message event and the outbound message event) of the single message trace are transformed into service actions (i.e., an action performed by the participant as part of the service definition) and added to a service definition, in block 240. For example, an outbound message event may be transformed into a 'send message' service action, and an inbound message event may be transformed into a 'receive message service action.

In block 230, if it is determined that the set of message traces includes more than one message trace, then one or more common message events found in all of the message traces in the set of message traces are identified, in block 250. The identified common message events found in each of the message traces are then transformed into service actions and added to the service definition, in block 260. Continuing the buyer-store example above, the two interaction models (i.e., the "handle successful purchase order" model and the "handle insufficient credit rating" model) both have a message trace for the store participant that begins with receiving an 'Order' message event. Therefore, in this example, there is a common message event across multiple message traces derived from the same participant in two interaction models. These common message events may be transformed into a single 'receive Order message' service action in the service definition.

In block 270, one or more distinct message events are identified in the set of message traces (i.e., a different send message event or a different receive message event in at least one of the message traces in the set of message traces). The distinct message events represent a divergence in the behavior of the participant and results in the creation of a "decision point" for inclusion in the service definition, in block 280. A path for each distinct message event emanates from the decision point (i.e., each distinct message event results in a new path emanating from the decision point). As such, the number of paths emanating from the decision point is based on the number of distinct message events across all of the message traces in the set of message traces.

Figure 3:
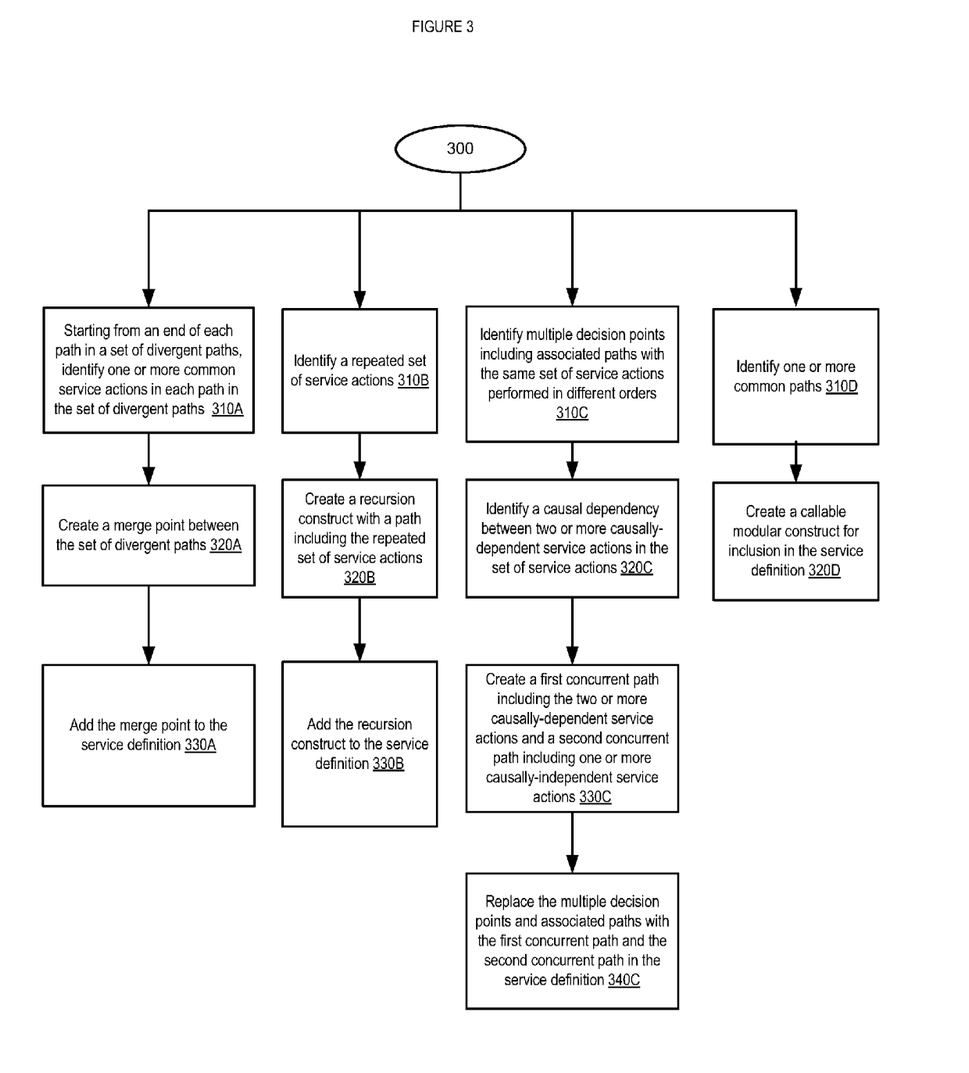
FIG. 3 is a flow diagram of exemplary methods for generating a service definition, according to an embodiment of the present invention.

In an embodiment, a subset of message traces is identified including multiple message traces which share the same message event, in block 290. For each identified subset of message traces, the actions in blocks 230-280 may be performed until all of the subsets of message traces have been processed. Advantageously, the optional iterative processing of the subsets of message traces (the optional nature is denoted by dashed lines in FIG. 2) provides for the further identification of service actions for inclusion in the service definition such that patterns and commonalities in the actions and behavior of the participant in the multiple decision point paths may be identified and integrated into the generated service definition In an embodiment, following the generation of a service definition in block 260 and/or block 290, method 300 may be performed in order to simplify the generated service definition through the identification of patterns, as shown in FIG. 3. In an embodiment, a set of divergent paths emanating from a particular decision point may be examined to identify one or more common service actions found in each path, in block 310A. In an embodiment, starting from the end of each path in the set of divergent paths, one or more common service actions are identified. Upon the identification of common service actions across the set of divergent paths, a merge point (i.e., a point of convergence of the paths) is created between the set of divergent paths and the common service actions are placed after the merge point, in block 320A. The merge point is then added to the service definition, in block 330A. The addition of the merge point to the service definition ensures that only the service actions that represent different behavior between the paths are described in the separate/distinct paths. In an embodiment, the identification of merge points an inclusion in the service definition in blocks 310A-330A may be performed recursively. In this embodiment, when a difference between service actions is identified at an end of the paths, the subsets of paths could be further considered, wherein the paths in the subsets of paths have a common end service action. The paths can be further recursively processed to create further merge points until only one path exists in the subset of paths and no further merge points can be generated.

In an embodiment, if the set of interaction models represent a set of use cases that reflect a repeated set of service actions, a hierarchy of decision points is produced in accordance with method 200. In an embodiment, the hierarchy of decision points may be examined and a repeated set of service actions found in a path emanating from each decision point may be identified, in block 310B. In block 320B, a recursion construct including the repeated set of service actions is created to replace the multiple instances of the repeated set of service actions. For example, the recursion construct may include a 'for' loop, wherein a condition is evaluated and, if 'true', the service actions defined within the loop are performed before re-evaluating the condition. In this example, when the condition is 'false', the loop is skipped. In block 330B, the recursion construct is added to the service definition.

In an embodiment, each decision point is examined to determine if the same service actions are found in all of the paths, but in different orders of execution. In block 310C, the multiple decision points including paths with the same set of service actions performed in different orders are identified. Such instances are indicative of situations wherein some or all of the service actions can be performed concurrently. In block 320C, one or more causal dependencies between service actions in the aforementioned set of service actions are identified. Two or more service actions having a causal relationship are referred to herein as "causally-dependent service actions". For example, assume the identification of the following three decision paths: ABC (i.e., wherein service action A is performed first, service action B is performed second, and service action C is performed third); ACB (i.e., wherein service action A is performed first, service action C is performed second, and service action B is performed third); and CAB (i.e., wherein service action C is performed first, service action A is performed second, and service action B is performed third). Based on an examination of the three paths, a causal dependency is identified between service action A and service action B (i.e., service action A and service action B are causally-dependent service actions), but service action C has no dependency on either service action A or service action B (i.e., service action C is a causally-independent service action).

In block 330C, a concurrent path is created for each set of causally-dependent service actions and a separate concurrent path is created to include the causally-independent service action(s). In the example described above, a first concurrent path is created which includes service actions A and B and a second concurrent path is created which includes service action C. In block 340C, the multiple decision points and associated paths are replaced by the created concurrent paths and added to the service definition.

In an embodiment, common sub-groups of service actions may be identified, in block 310D. In such cases, reusable and callable modular construct (i.e., like a callable function) are created for the common sub-groups and added to the service definition, in block 320D. In an embodiment, a pointer or other reference representing the callable modular construct may be added to the original location in the service definition.

It is noted that the various approaches for refinement of the generated service definitions (i.e., 310A-330A; 310B-330B; 310C-340C; and 310D-320D) may be performed individually or in combination with one another. In this regard, any or all of the refinement options illustrated in FIG. 3 and described above may be performed to further refine a service definition generated in accordance with embodiments of the present invention, such as a service definition generated in accordance with method 200.

Figure 4:
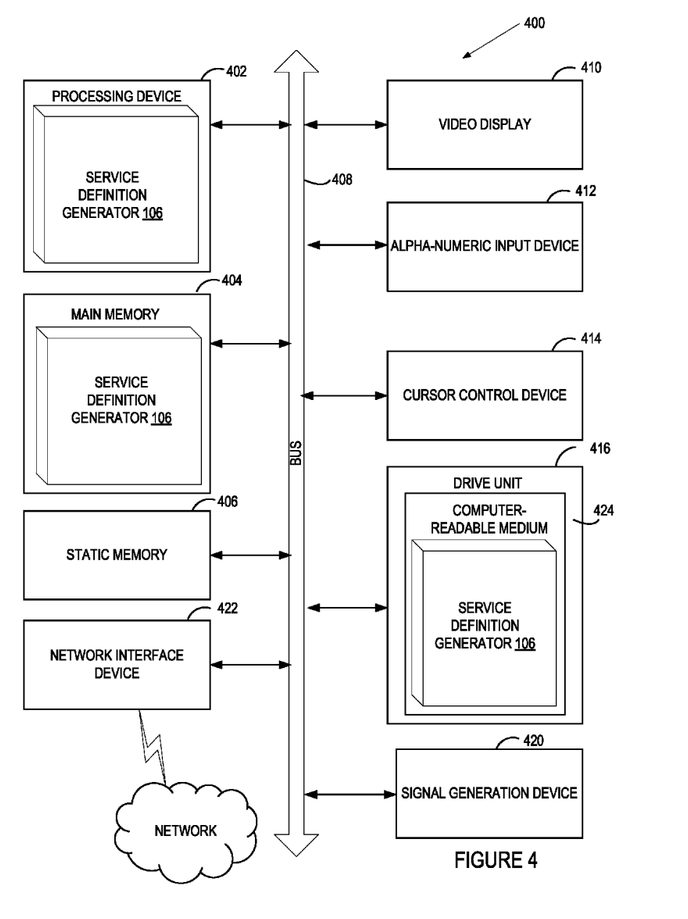
FIG. 4 illustrates an exemplary service definition generation system, according to an embodiment of the present invention.

FIG. 4 illustrates an exemplary service definition generation system 400 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary service definition generation system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The service definition generator 106 in FIG. 1 may comprise processing device 402 configured to perform the operations and steps discussed herein.

The service definition generation system 400 may further include a network interface device 422. The service definition generation system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of the service definition generator 106) embodying any one or more of the methodologies or functions described herein. The instructions of the service definition generator 106 may also reside, completely or at least partially, within the main memory 404 and/or within the processing device 402 during execution thereof by the service definition generation system 400, the main memory 404 and the service definition generator 106 also constituting computer-readable media. The instructions of the service definition generator 106 may further be transmitted or received over a network via the network interface device 422. In an embodiment, the service definition generator 106 may be installed on (i.e., via a download or via a computer-readable storage medium) a user device (e.g., user device 102 in FIG. 1) for execution on the user device. In an embodiment, the user device may include the various components illustrated in FIG. 4.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "grouping", "receiving", "extracting", "identifying", "transforming", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a set of interaction models relating to a participant;
extracting a set of message traces from the set of interaction models;
identifying a common message event in each message trace of the set of message traces, wherein the common message event comprises at least one of a same send message event or a same receive message event;
identifying a subset of message traces of the set of message traces each comprising the common message;
transforming, by a processing device, the common message event into a service action;
generating a service definition comprising the service action;
identifying a plurality of divergent paths emanating from a particular decision point in the service definition;
identifying a same single common service action at an end of each path in the plurality of divergent paths;
creating a merge point joining the plurality of divergent paths, wherein the same single common service action emanates from the merge point; and
adding the merge point to the service definition.

2. The method of claim 1 further comprising:
identifying a distinct message event in the set of message traces; and
adding a decision point to the service definition, wherein the decision point comprises a path for the distinct message event.

3. The method of claim 2 further comprising identifying, for each path, a subset of message traces sharing a common message event.

4. The method of claim 3 further comprising:
identifying an additional common message event in the subset of message traces;
transforming the additional common message event into an additional service action; and
adding the additional service action to the service definition.

5. The method of claim 2 further comprising:
identifying a repeated set of service actions in the service definition;
creating a recursion construct, wherein a recursion path comprising the repeated set of service actions emanates from the recursion construct; and
adding the recursion construct and the recursion path to the service definition.

6. The method of claim 2 further comprising:
identifying a plurality of decision points comprising a common set of service actions performed in different orders in the service definition;
identifying a causal dependency between a set of service actions in the common set of service actions;
creating a concurrent path for each set of causally-dependent service actions and an additional concurrent path for each causally-independent service action; and
replacing the multiple decision points with the concurrent path and the additional concurrent path in the service definition.

7. The method of claim 1 further comprising:
identifying a common path in the service definition;
creating a callable modular construct for each of the common path; and
replacing the common path with the callable modular construct in the service definition.

8. A non-transitory computer-readable storage medium comprising instructions that, when executed by a processing device, cause the processing device to:
receive a set of interaction models relating to a participant;
extract a set of message traces from the set of interaction models;
identify a common message event in each message trace of the set of message traces wherein the common message event comprises at least one of a same send message event or a same receive message event;
transform, by the processing device, the common message event into a service action;
generate a service definition comprising the service action;
identify a plurality of divergent paths emanating from a particular decision point in the service definition;
identify a same single common service action at an end of each path in the plurality of divergent paths;
create a merge point joining the plurality of divergent paths, wherein the same single common service action emanates from the merge point; and
add the merge point to the service definition.

9. The non-transitory computer-readable storage medium of claim 8, the processing device to:
identify a distinct message event in the set of message traces; and
add a decision point to the service definition, wherein the decision point comprises a path for the distinct message event.

10. The non-transitory computer-readable storage medium of claim 9, the processing device to identify, for each path, a subset of message traces sharing a common message event.

11. The non-transitory computer-readable storage medium of claim 10, the processing device to:
identify an additional common message event in the subset of message traces;
transform the additional common message event into an additional service action; and
add the additional service action to the service definition.

12. The non-transitory computer-readable storage medium of claim 9, the processing device to:
identify a repeated set of service actions in the service definition;
create a recursion construct, wherein a recursion path comprising the repeated set of service actions emanates from the recursion construct; and
add the recursion construct and the recursion path to the service definition.

13. The non-transitory computer-readable storage medium of claim 9, the processing device to:
identify a plurality of decision points comprising a common set of service actions performed in different orders in the service definition;
identify a causal dependency between a set of service actions in the common set of service actions;
create a concurrent path for each set of causally-dependent service actions and an additional concurrent path for each causally-independent service action; and
replace the multiple decision points with the concurrent path and the additional concurrent path in the service definition.

14. The non-transitory computer-readable storage medium of claim 8, the processing device to:
identify a common path in the service definition;
create a callable modular construct for each of the common path; and
replace the common path with the callable modular construct in the service definition.

15. A system comprising:
a memory to store a set of interaction models; and
a processing device, operatively coupled to the memory, the processing device to:
receive the set of interaction models relating to a participant;
extract a set of message traces from the set of interaction models;
identify a common message event in each message trace of the set of message traces, wherein the common message event comprises at least one of a same send message event or a same receive message event;
transform the common message event into a service action;
generate a service definition comprising the service action;
identify a plurality of divergent paths emanating from a particular decision point in the service definition;
identify a same single common service action at an end of each path in the plurality of divergent paths;
create a merge point joining the plurality of divergent paths, wherein the same single common service action emanates from the merge point; and
add the merge point to the service definition.

16. The system of claim 15, the processing device to:
identify a distinct message event in the set of message traces, and
add a decision point to the service definition, wherein the decision point comprises a path for the distinct message event.

17. The system of claim 16, the processing device to identify, for each path, a subset of message traces sharing a common message event.

18. The system of claim 17, the processing device to:
identify an additional common message event in the subset of message traces,
transform the additional common message event into an additional service action, and
add the additional service action to the service definition.

19. The system of claim 16, the processing device to:
identify a repeated set of service actions in the service definition,
create a recursion construct, wherein a recursion path comprising the repeated set of service actions emanates from the recursion construct, and
add the recursion construct and the recursion path to the service definition.

20. The computer system of claim 16, the processing device to:
identify a plurality of decision points comprising a common set of service actions performed in different orders in the service definition,
identify a causal dependency between a set of service actions in the common set of service actions,
create a concurrent path for each set of causally-dependent service actions and an additional concurrent path for each causally-independent service action, and
replace the multiple decision points with the concurrent path and the additional concurrent path in the service definition.

21. The system of claim 15, the processing device to:
identify a common path in the service definition,
create a callable modular construct for each of the common path, and
replace the common path with the callable modular construct in the service definition.

\* \* \* \* \*